(12) United States Patent
Fang

(10) Patent No.: US 10,985,875 B2
(45) Date of Patent: Apr. 20, 2021

(54) MULTIPLE ACCESS POINT OPERATION OF A WIRELESS NETWORK

(71) Applicant: ZTE Corporation, Guangdong (CN)

(72) Inventor: Yonggang Fang, San Diego, CA (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/297,564

(22) Filed: Mar. 8, 2019

(65) Prior Publication Data

US 2020/0287664 A1    Sep. 10, 2020

(51) Int. Cl.
| | |
|---|---|
| *H04W 4/00* | (2018.01) |
| *H04L 1/18* | (2006.01) |
| *H04W 74/04* | (2009.01) |
| *H04W 24/02* | (2009.01) |

(52) U.S. Cl.
CPC ........... *H04L 1/1812* (2013.01); *H04W 74/04* (2013.01); *H04W 24/02* (2013.01)

(58) Field of Classification Search
CPC .............. H04L 67/2814; H04L 67/327; H04L 29/12216; H04L 61/2007; H04W 48/20; H04W 8/065; H04W 80/04; H04W 48/16; H04W 84/12; H04W 12/06; H04W 12/0808; H04W 12/08
See application file for complete search history.

(56) References Cited

U.S. PATENT DOCUMENTS

| | | | | |
|---|---|---|---|---|
| 2007/0076752 A1* | 4/2007 | Zeira | ..................... | H04W 74/08 370/466 |
| 2008/0186933 A1* | 8/2008 | Willman | ............... | H04W 88/02 370/338 |
| 2010/0165928 A1* | 7/2010 | Chen | .................... | H04L 67/2814 370/329 |
| 2011/0110349 A1* | 5/2011 | Grandhi | ................ | H04W 48/14 370/338 |
| 2014/0286321 A1* | 9/2014 | Balian | .................... | H04W 12/06 370/338 |

(Continued)

FOREIGN PATENT DOCUMENTS

| | | |
|---|---|---|
| CN | 108738098 A | 2/2018 |
| WO | 2019040345 A1 | 2/2019 |
| WO | 2019045704 A1 | 7/2019 |

OTHER PUBLICATIONS

IP Office China PRC, International Search Report and Written Opinion for Application No. PCT/CN2020/077387, dated May 27, 2020, 8 pgs.

*Primary Examiner* — Jung Liu
(74) *Attorney, Agent, or Firm* — Perkins Coie LLP

(57) ABSTRACT

Methods, systems, and devices related to related to digital wireless communication, and more specifically, to techniques related to station controlled multi-access point transmission and retransmission. In one exemplary aspect, a method for wireless communication includes receiving a multi-network node capability indication message from a first network node and a second network node indicating that each of the first network node and the second network node are capable of transmitting multi-network node transmissions. The method also includes transmitting a multi-network node association request message to the first network node and the second network node to associate the first network node and second network node into a group of network nodes.

28 Claims, 13 Drawing Sheets

(56) References Cited

U.S. PATENT DOCUMENTS

2015/0249954 A1* 9/2015 Patil ................. H04W 48/16
                                                    370/338
2016/0301459 A1* 10/2016 Grandhi ............. H04W 84/12

* cited by examiner

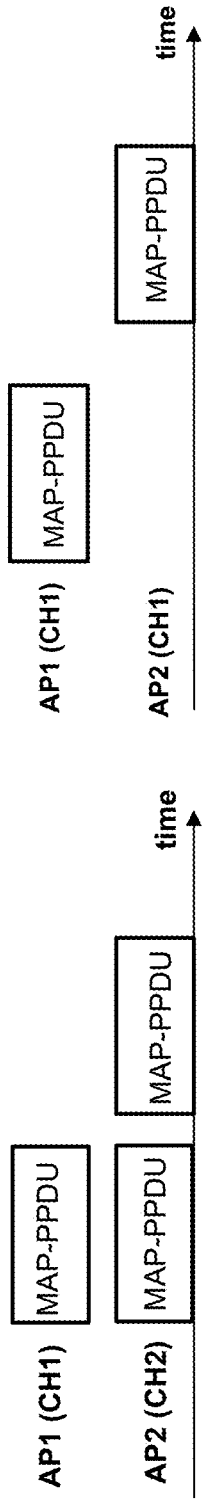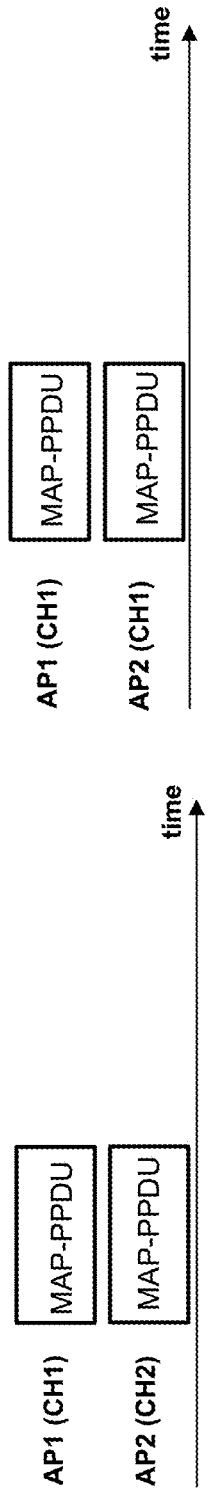
FIG. 2A  FIG. 2B  FIG. 3A  FIG. 3B

MULTIPLE ACCESS POINT OPERATION OF A WIRELESS NETWORK

TECHNICAL FIELD

This patent document is directed generally to wireless communications.

BACKGROUND

Wireless communication systems can include a network of one or more access points (APs) that communicate with one or more wireless stations (STAs). An AP may emit radio signals that carry management information, control information or user data to one or more STAs. A STA may transmit radio signals to an AP in the same frequency channel using a technique such as time division duplexing (TDD) or in a different frequency using a technique such as frequency division duplexing (FDD).

Institute of Electrical and Electronics Engineers (IEEE) 802.11 specifies a specification for a wireless local area network (WLAN) over radio channels in license-exempt bands. The basic unit of a WLAN is a basic service set (BSS). An infrastructure BSS may include the BSS with stations through associating with an Access Point (AP) to connect to the wired network or Internet. In an infrastructure BSS, both an access point and a station may share the same frequency channel via using Carrier Sensing Multiple Access with Collision Avoidance (CSMA/CA) technology, a kind of TDD mechanism, for multiple access and data transmission.

SUMMARY

This document discloses methods, systems, and devices related to digital wireless communication, and more specifically, to techniques related to utilizing multiple access points to transmit user data to a station to improve transmission reliability.

In one exemplary aspect, a method for wireless communication includes receiving a multi-network node capability indication message from a first network node and a second network node indicating that each of the first network node and the second network node are capable of transmitting multi-network node transmissions. The method also includes transmitting a multi-network node association request message to the first network node and the second network node to associate the first network node and second network node into a group of network nodes.

In another exemplary embodiment, a method for wireless communication includes transmitting a first message to a first network node and a second network node in a multi-network node group, wherein the first message includes transmission configuration information. The method also includes receiving data from at least one of the first network node and the second network node in the multi-network node group based on the transmission configuration information.

In another exemplary embodiment, a method for wireless communication includes receiving scheduling information from a controller to schedule a time to transmit a send request message to a station. The method also includes transmitting the send request transmission to the station at the time indicated by the controller based on the scheduling information.

In another exemplary embodiment, a method for wireless communication includes receiving a first message from a first network node included in a group of network nodes. The method also includes determining that an error exists in a part of the first message. The method also includes transmitting a second message indicating a request to the first network node to re-transmit the part of the first message.

In another exemplary embodiment, a method for wireless communication includes receiving a first message from a first network node included in a group of network nodes. The method also includes determining that a part of the first message includes an error. The method also includes transmitting a second message to a second network node included in the group of network nodes, wherein the second message includes a request to re-transmit the part of the first message that includes the error.

The details of one or more implementations are set forth in the accompanying attachments, the drawings, and the description below. Other features will be apparent from the description and drawings, and from the claims.

BRIEF DESCRIPTION OF THE DRAWINGS

FIGS. 2A-2B illustrate examples of selective transmission of a MAP-G.

FIGS. 3A-3B illustrate examples of joint transmission of a MAP-G.

DETAILED DESCRIPTION

Wireless local area communication is fast becoming a popular mechanism to communicate with each other directly or via a network such as the internet. Multiple wireless devices (e.g., smartphones, tablets, etc.) may attempt to transmit and receive data on a shared communication spectrum in an environment (e.g., airport, homes, buildings, sports venues, etc.). Additionally, wireless devices (e.g., sensors, cameras, control units, etc.) are increasingly utilized in networks for various applications (e.g., factory automations, vehicle communications etc.).

In some cases, transmission of data is based on an air interface as specified by the Institute of Electrical and Electronics Engineers (IEEE), standard 802.11 series. In this specification, devices may share a transmission medium that include a certain set of rules. In IEEE 802.11, the basic service set (BSS) is a building block of a Wireless Local Area Network (WLAN). Wireless stations (also called stations) associated in the radio coverage area may establish a BSS and provide the basic service of a WLAN.

IEEE 802.11 specifies wireless access protocols for operation on a license exempt and/or shared spectrum. A station can operate on a channel in license exempt frequency band (e.g., 2.4 GHz or 5 GHz), or shared frequency band with other services (e.g., 6 GHz).

When operating on a license exempt or shared spectrum, transmission and reception of wireless messages may be unreliable due to interference from other stations located within the same coverage area, such as hidden node transmissions or "visible" nodes attempting to utilize the common communication medium for transmissions. These unreliable transmissions may lead to transmitted packet loss, longer delay of transmission due to using Enhanced Distributed Channel Access (EDCA), and larger jittering in an unstable radio environment. Such unreliable transmissions also may create a decreased user experience and limit the performance of applications that require low latency and high reliability over a IEEE802.11 access network.

In some cases, as the IEEE802.11 specification allows for one station to associate with one access point, it may be more difficult for the station to receive a reliable transmission when there is inference around the associated access point.

This patent document describes technique to improve transmission reliability in WLAN networks by implementing a mechanism to control station-controlled multi access-point (MAP) transmissions that utilize Hybrid Automatic Repeat Request (HARD) retransmissions over multiple channels.

Figure 1:
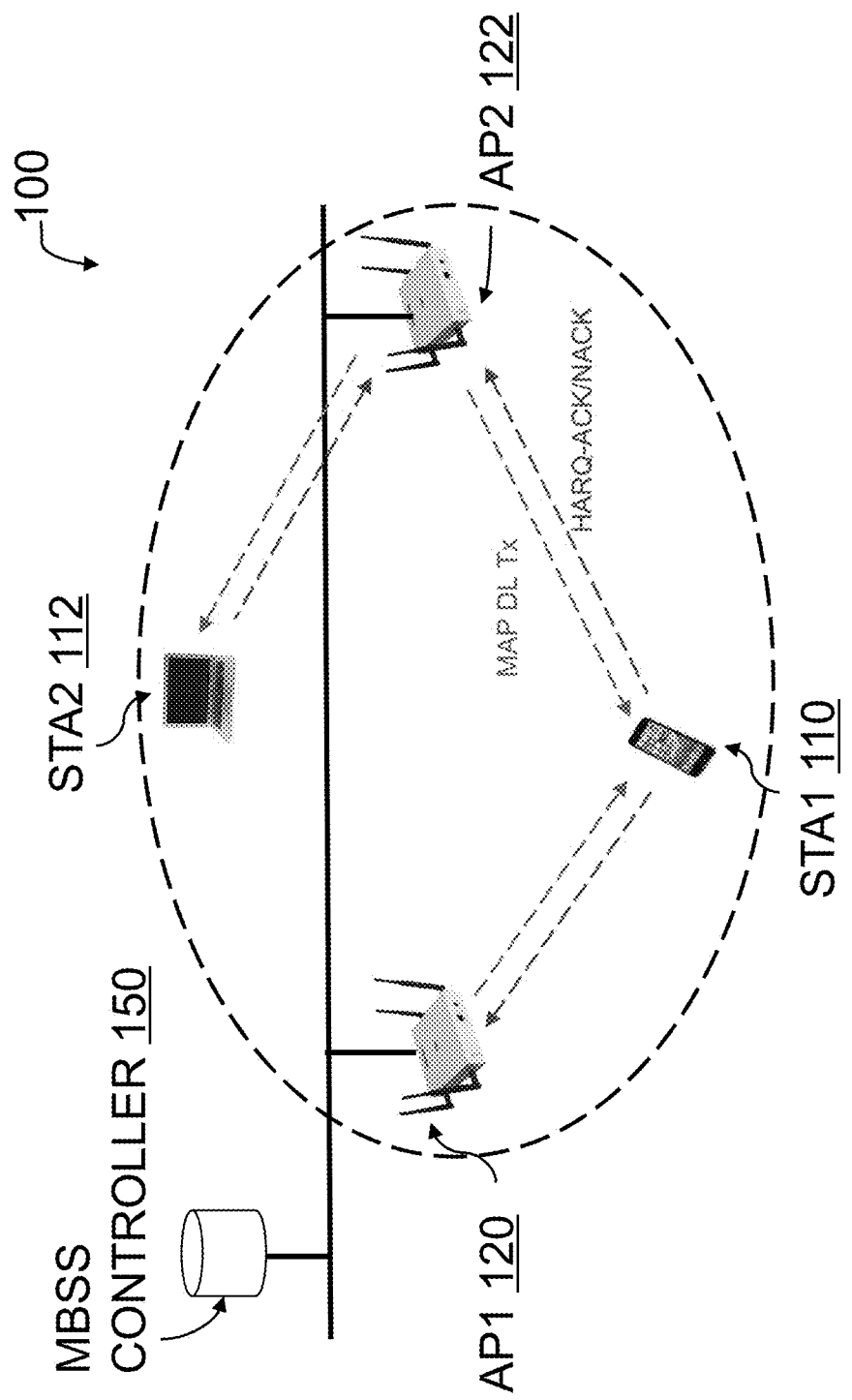
FIG. 1 illustrates an example infrastructure Multi-BSS (MBSS).

FIG. 1 illustrates an example infrastructure Multi-BSS (MBSS). The infrastructure may include multiple stations STA1 110 and STA2 112. Each station may be included in the coverage of a first access point AP1 120 and a second access point AP2 122, which form the infrastructure BSS: BSS1 and BSS2. Access Points AP1 120 and AP2 122 may be interconnected via a switch through a distribution system (DS) to form a multi-BSS (MBSS) 100 coordinated via a MBSS controller 150. The MBSS controller 150 may include a network function located at the gateway of any AP in the MBSS 100. In some embodiments, if the MBSS Controller 150 is located at the gateway of the DS, the MBSS controller 150 may include a full MAC protocol stack or a partial MAC protocol stack.

In some embodiments, a station (e.g., STA1 110) with multiple radios can operate on one or more channels (or OFDMA channels) in the same frequency band or a different band. The station can associate with multiple access points (MAP) in the MBSS coverage to form a MAP group (MAP-G). A MAP-G may include a station (e.g., STA1 110) and one or more APs (e.g., AP1 120). The MAP-G may include a station-centric multiple access point group.

In some embodiments, the MAP-G leverages the joint or selective transmissions over one or multi-channels (or multi OFDMA channels) to improve the downlink transmission reliability under the control of a STA (e.g., STA1 110) and/or coordinated by the MBSS Controller 150. A joint downlink transmission may refer to two or more APs that transmit the same PPDU to the STA at the same time. The STA may combine the received signals in either a radio frequency (RF) or baseband to improve the signal-to-noise-ratio (SINR) of received signals to improve the reliability of transmissions.

A selective downlink transmission may refer to AP1 120, AP2 122, or both access points transmitting a downlink PPDU to a STA. The STA may selectively receive the transmission from either AP1 120 or AP2 122.

In some embodiments, the STA may leverage the hybrid automatic repeat request (HARD) mechanism to request the retransmission from AP1 120 in the MAP-G over one or multi (OFDMA) channels to improve transmission reliability.

FIGS. 2A-B illustrate examples of selective transmission of a MAP-G. In a first embodiment as shown in FIG. 2A, MAP-G selective transmission may include a first AP AP1 transmitting over a first channel CH1 and a second AP AP2 transmitting over a second channel CH2, where each channel may be a regular channel or a OFDMA channel. In this embodiment, AP1 or AP2 can transmit a MAP PPDU on a channel (CH1, CH2) simultaneously or selectively depending on the request of the STA in the MAP-G. The STA in MAP-G may selectively receive the best MPDU among the multiple received MPDUs if both AP1 and AP2 transmit an MAP PPDU simultaneously.

In a second embodiment as shown in FIG. 2B, MAP-G selective transmission may include a first AP AP1 transmitting over a first channel CH1 and a second AP AP2 transmitting over the same channel CH1. Either AP1 or AP2 can transmit an MAP PPDU to the STA. According to the receiving condition, the STA in MAP-G may control the selection of MAP transmission by sending an upper link control frame to AP1 or AP2 to request the selective MAP PPDU transmission.

FIGS. 3A-B illustrate examples of joint transmission of a MAP-G. In a first embodiment as shown in FIG. 3A, the joint MAP transmission may include a first AP AP1 operating on a first channel and a second AP AP2 operating on a second channel. CH1 and CH2 can be in the same or different channel bands. AP1 and AP2 may transmit the same MAP PPDU over CH1 or CH2 jointly. The STA in the MAP-G may perform a maximum ratio combining among the received joint MAP PPDU transmissions in the baseband.

In a first embodiment as shown in FIG. 3B, the joint MAP transmission may include AP1 and AP2 operating on the same channel, i.e. both AP1 and AP2 are on either CH1 or CH2. AP1 and AP2 may transmit an MAP PPDU jointly. The STA in the MAP-G may combine the received joint MAP PPDU transmissions in a radio frequency (RF) module for improving a SINR of the received PPDU.

In some embodiments, station controlled multi-AP transmission and HARQ re-transmission may include forming a multi-AP group (MAP) to coordinate the MAP transmission and HARQ re-transmission in downlink. The MAP-G formation may be based on the enhancement of existing association request/response or define a set of new messages for establishment of the MAP-G.

Figure 4:
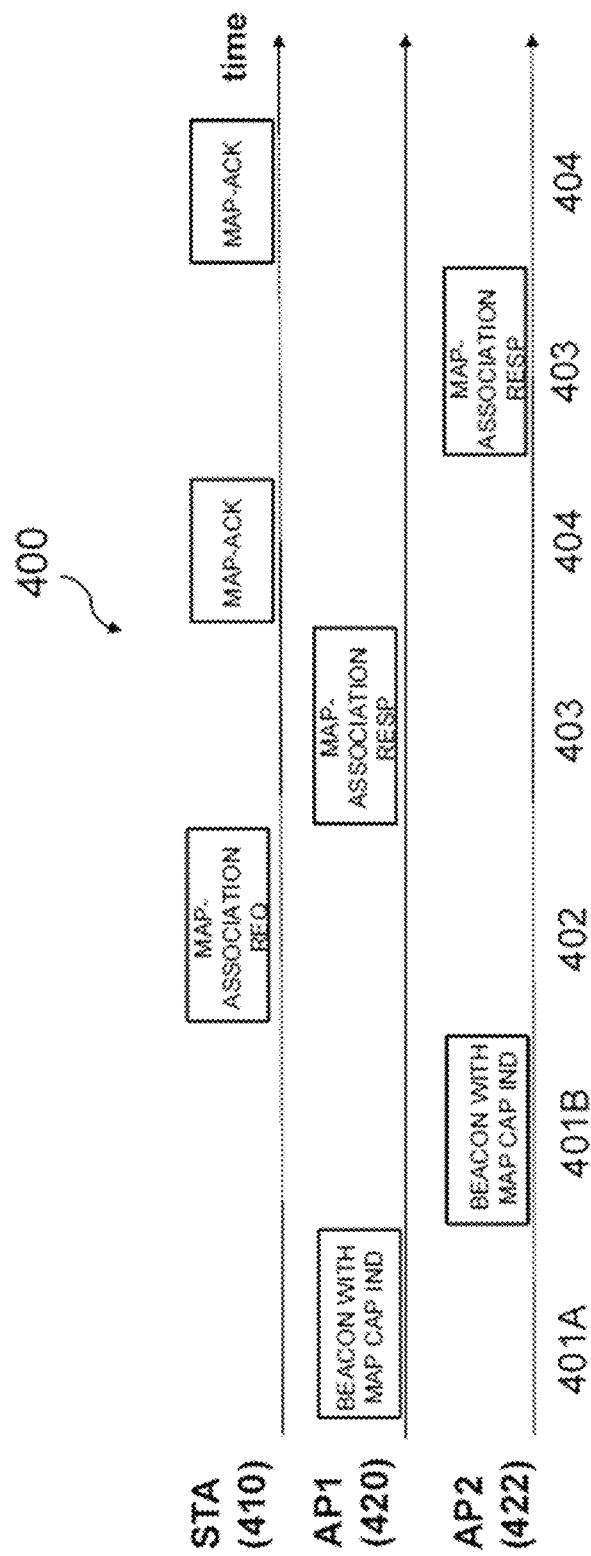
FIG. 4 illustrates an example signaling process 400 of MAP-G establishment based on association request and response messages.

FIG. 4 illustrates an example signaling process 400 of MAP-G establishment based on association request and response messages. As shown in FIG. 4, at steps 401A-B, AP1 420 and AP2 422 may be MAP-capable access points. The access points 420, 422 may broadcast the MAP Support information and HARQ Support information in an Extremely High Throughput (EHT) Capability Information Element of a beacon, or in a Probe Response frame. In an embodiment, if an AP supports the MAP, a MAP Support Indication may be changed to a first value. Otherwise, the MAP Support Indication may be set to a second value. Similarly, if the AP supports the HARQ, the AP may set the HARQ Support Indication to a third value. Otherwise, the AP may set the HARQ Support Indication to a fourth value.

In step 402, a station (e.g., STA 410) in the MBSS coverage area may check the Beacon or Probe Response frames and determine whether neighbor APs can support MAP and HARQ features. If the STA 410 determines that a neighbor APs (e.g., AP2 422) are MAP and/or HARQ capable, the station may send a MAP Association Request to the AP 420, 422, where the MAP Association Request may include a request to form a MAP-G over a single operation channel or multiple operation channels. The STA 410 may include a MAP-G identifier (MAP-G ID) related to a station identifier (STA ID) in the MAP Association Request. The MAP-G ID may be used to identify the MAP-G until it is released.

In step 403, when receiving the MAP Association Request from the STA, AP1 420 and AP2 422 may process the MAP Association Request and send a MAP Association Response to acknowledge whether it can join in the requested MAP-G over a single channel or over multiple channel sequentially or simultaneously. The AP1 420 and/or AP2 422 includes the MAP-G ID and other MAP-G information in the MAP Association Response AP1 420 and/or AP2 422 may use the MAP Association Request message to adjust or refine the AP timing to align with the timing of STA 410 and control them within less than CP time of the OFDM symbol. After that, AP1 420 and AP2 422 may be ready for the following MAP transmissions.

In step 404, the STA may send an MAP-ACK to confirm the MAP member joining the MAP-G.

After the MAP-G is formed, the STA can send an MAP Re-Association Request to update the MAP-G, such as adding a new AP or remove an existing AP. The APs in the MAP-G may respond with the MAP Re-association Response.

The members of a MAP-G (i.e. STA and MAPs) can set up a timer to track the MAP-G lifecycle after the MAP-G formation. If the timer expires, the MAP-G can be released. If the MAP-G members detect any activity in the MAP-G before the timer expiration, it can reset the timer to maintain the life of MAP-G.

In some embodiments, if the STA dis-associates with all the members in the MAP-G via sending a Disassociation Request, the MAP-G may be released.

In some embodiments, station controlled multi-AP transmission and HARQ re-transmission may include establishment a MAP TXOP protection. When there is some buffered data for the STA, the MBSS controller may coordinate all MAP-G members to schedule sending an MAP-RTS to request an establishment of MAP TXOP for the downlink MAP transmissions.

Figures 5A, 5B:
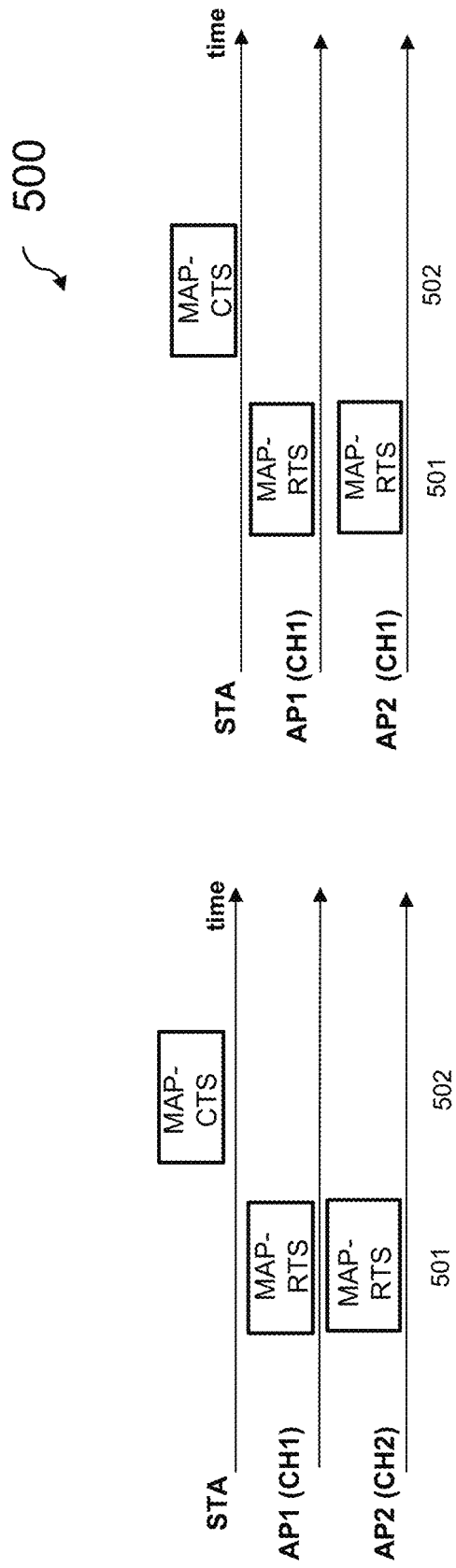
FIGS. 5A-5B illustrate example signaling processes for MAP transmission protection establishment.

FIGS. 5A-B illustrate example signaling processes for MAP transmission protection establishment. In a first embodiment as shown in FIG. 5A, the MAP transmission protection may be established when AP1 and AP2 of MAP-G are on different channel. In a second embodiment as shown in FIG. 5B, the MAP transmission protection may be established when AP1 and AP2 of MAP-G are operating on the same channel.

In step 501, a MBSS Controller 150 may coordinate the AP1 and AP2 in MAP-G to schedule an MAP-RTS transmission to the STA. In the first embodiment in FIG. 5A, both AP1 and AP2 may transmit the MAP-RTS over CH1 and CH2 respectively. In the second embodiment in FIG. 5B, either one of AP1 or AP2 or both AP1 and AP2 in the MAP-G may transmit the MAP-RTS request over CH1.

Meanwhile, the MBSS Controller may coordinate to send the downlink MAP data to all the MAP-G members, i.e. AP1 and AP2, to prepare the MAP transmission to the STA. The AP1 and AP2 may then prepare the MAP transmissions.

In step 502, after receiving the MAP-RTS request from MAP-G member(s), the STA may send an MAP-CTS over CH1 or CH2 or both to confirm and activate the MAP-transmission with the requested members of MAP-G. The STA and MAP may use the MAP-RTS and MAP-CTS to establish a TXOP for the following MAP transmission. Other STAs that receive MAP-RTS and/or MAP-CTS may set their NAVs to prevent from sending data during the MAP TXOP period.

The STA may include information about MAP transmission in the MAP-CTS to trigger the MAP transmissions immediately, such as a preferred MAP transmission type: Selective MAP transmission or Joint MAP transmission; a MAP transmission switch reservation for joint MAP transmission; a HARQ re-transmission type: HARQ or non-HARQ Chase Combining (CC), or Incremental Redundancy (IR); the identities of APs in the MAP-G; a RSSI measurement; preferred down link transmission power on the operating channel; a requested transmit time, etc.

In some embodiments, the station controlled multi-AP transmission and HARQ re-transmission may include selective MAP transmissions.

Figure 6A:
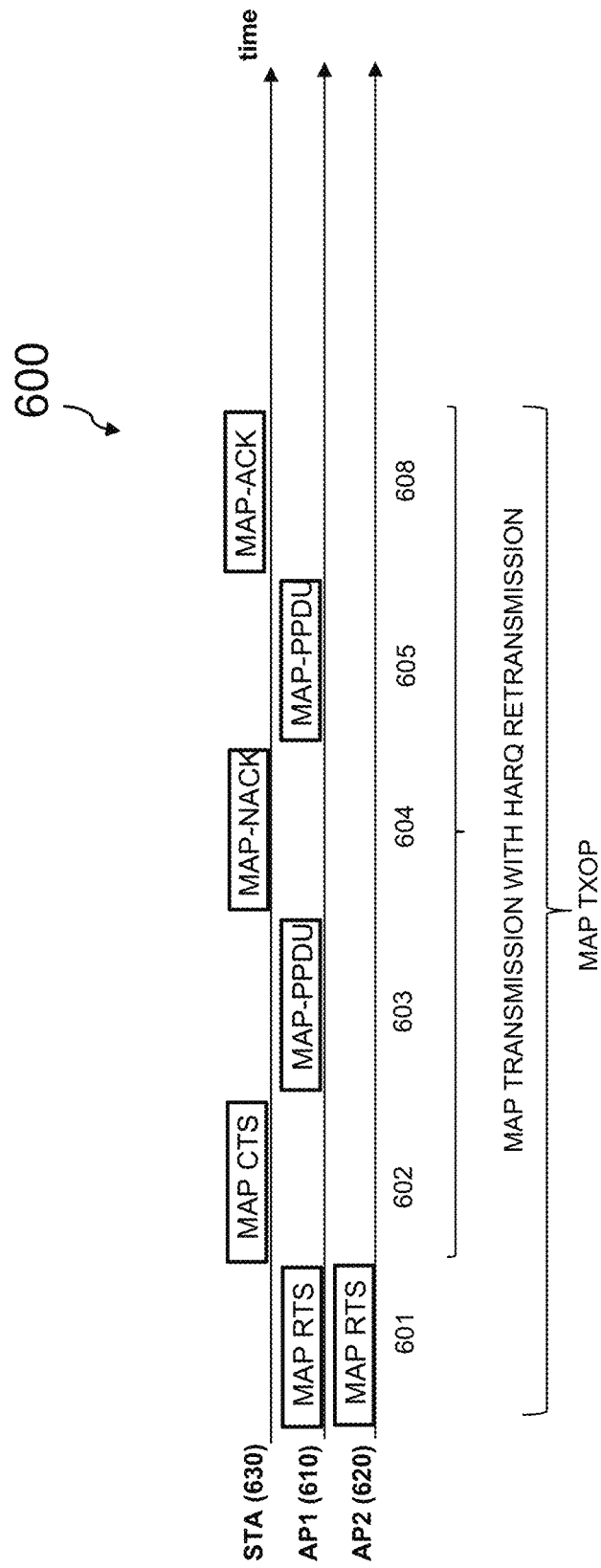
FIGS. 6A-6B illustrate example signaling processes for selective MAP transmissions with HARQ re-transmission and switch MAP.
Figure 6B:
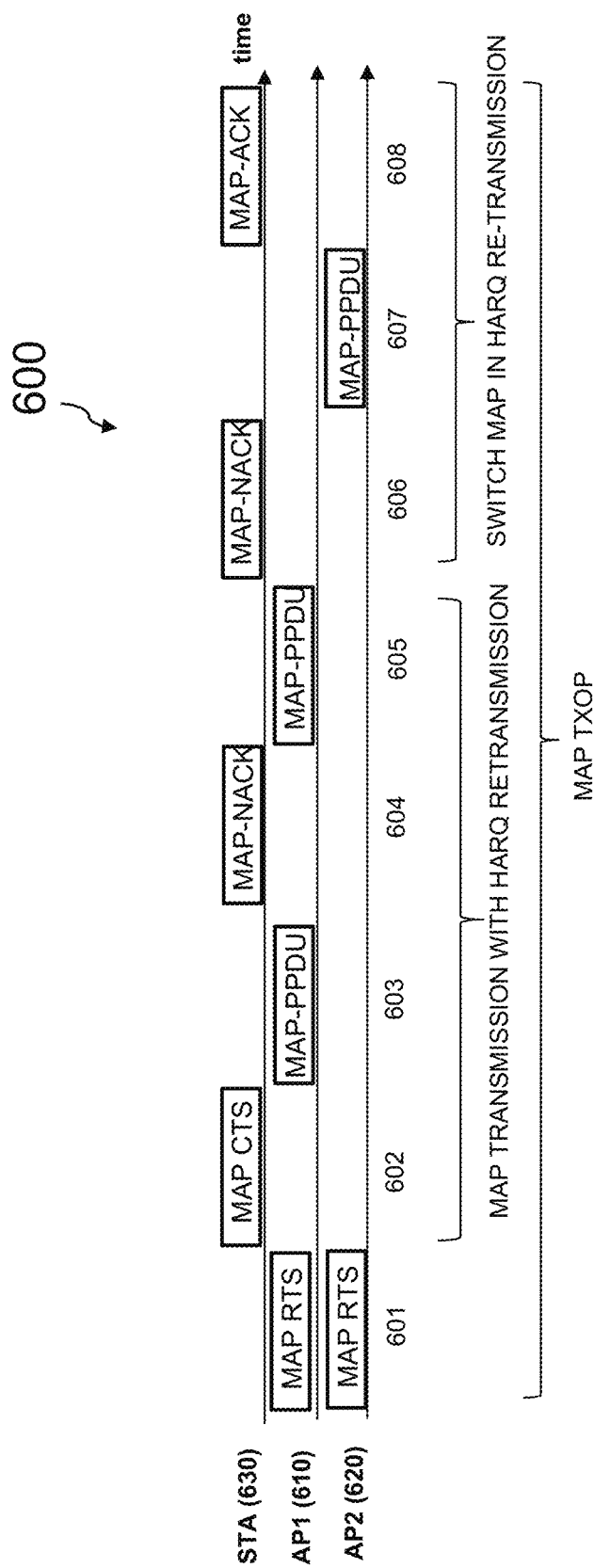

FIGS. 6A-B illustrate example signaling processes for selective MAP transmissions with HARQ re-transmission and switch MAP. In step 601, the MBSS Controller 150 may coordinate the APs in MAP-G to schedule the MAP transmissions to the STA and coordinate to send the downlink MAP data to all the MAP-G members, i.e. AP1 610 and AP2 620. The AP1 610 in this example may transmit an MAP-RTS to establish the MAP TXOP and protect the MAP communications with the STA 630. Other near-by non-MAP-G STAs receiving this MAP-RTS may set their NAV to prevent from interfering the MAP transmissions.

In step 602, after receiving the MAP-RTS, the STA 630 may send a MAP-CTS to confirm the MAP TXOP establishment and indicate the preferred MAP transmission options, such as preferred MAP transmission type, HARQ re-transmission type, AP ID(s), etc. for the following transmission(s). Other near-by non-MAP-G STAs receiving this MAP-CTS may set their NAV to prevent from interfering the MAP transmissions.

In step 603, based on the preferred MAP transmission information in the MAP-CTS, the selected AP (e.g. AP1 610) may transmit a MAP-PPDU to the STA 630 that may include aggregated MPDUs (A-MPDUs). The AP1 610 set the MAP-G ID to the SA field and the STA address to the RA field in the MAC header.

In step 604, the STA 630 may perform error checking on the received MAP-PPDU from AP1 610, or error checking on each received MPDU. If there exists an error on the received MAP-PPDU (or individual MPDU), the STA 630 may send a MAP non-acknowledgement message (MAP-NACK) to the AP1 610 to request a re-transmission of failed MPDU(s). The STA 630 may request the AP1 610 to send HARQ re-transmitted PPDU on different RU(s) to avoid the interference on some particular RUs.

The STA 630 may set the source address (SA) to its address and receiving address (RA) to the address of MAP-G ID in the MAP-NACK. The STA may set the destination address (DA) to the MAP-G ID if a DA is present. The STA may set the MAP-G ID in the Common Info of MAC header of MAP-NACK frame. As the MAP-NACK message is designated to MAP-G, the AP2 620 in the MAP-G may be able to receive the MAP-NACK and perform the transmission synchronization with AP1 610 for the MAP transmission switch if the MAP transmission reservation switch is being set.

In step 605, AP1 610 may re-send the failed MPDU(s) in MAP-PPDU to the STA 630 with setting the MAP-G ID to the SA field and the STA address to the RA field. The MAP-PPDU may be independently decodable for the STA to perform error checking.

In step 606, the STA 630 may apply a soft-decode to check whether the CC or IR can correct the error(s) in the previous decoding. If an error is still detected in the HARQ re-transmitted MAP-PPDU (or individual MPDU), the STA 630 may send a MAP-NACK to request another HARQ re-transmission. If experiencing on the failure in successive HARQ re-transmission(s), the STA 630 may request to switch to a different AP in the MAP-G for the HARQ re-transmission in the MAP-NACK message if the STA 630 can detect the AP2 620 in MAP-G is idle and the MAP TXOP has been reserved for the MAP-G member to switch MAP transmission.

In step 607, if the AP2 620 receives the MAP-NACK with the MAP-G ID matching to its MAP-G, the AP may start the HARQ re-transmission for the failed MPDU(s) in the MAP-PPDU.

In step 608, if the STA 630 fails to receive the MAP-PPDU for the HARQ re-transmission in the given time, it may trigger a retransmission time-out. The STA 630 may send another MAP-NACK or report a HARQ failure after a number of re-trials. If the STA 630 receives the MAP-PPDU, it may apply the soft-decode to check whether the CC or IR can correct the error(s) in the previous decoding. If the error can be corrected in the HARQ re-transmission, the STA 630 may send an MAP-ACK to acknowledge MAP-G members for the success of MAP PPDU transmission.

After receiving the MAP-ACK, the MBSS Controller 150 may coordinate to schedule another MAP transmission in the MAP TXOP if there is more data buffered for the STA 630 and MAP TXOP is allowed for scheduling another MAP transmission.

In some embodiments, station controlled multi-AP transmission and HARQ re-transmission may include joint MAP transmissions.

Figure 7:
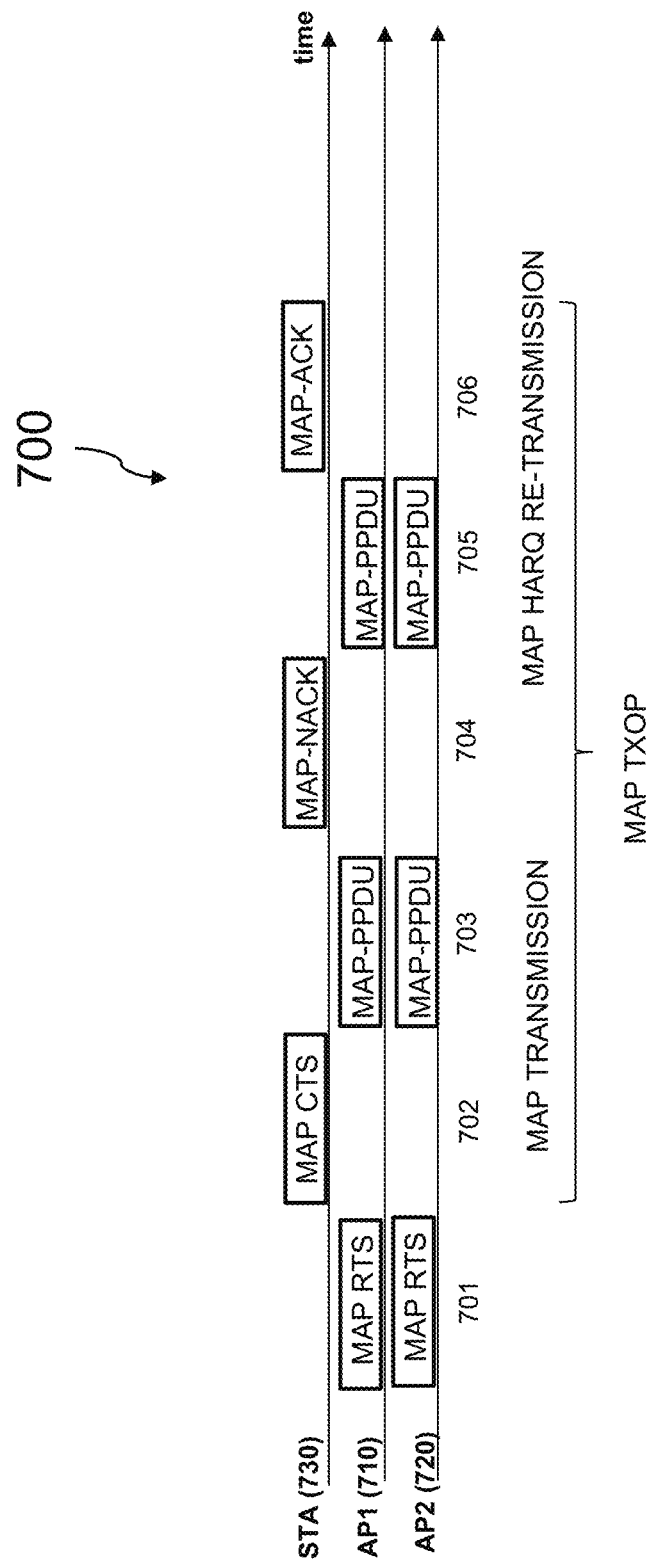
FIG. 7 illustrates an example signaling process for joint MAP transmission with HARQ re-transmission.

FIG. 7 illustrates an example signaling process for joint MAP transmission with HARQ re-transmission. In step 701, the MBSS Controller 150 may coordinate the APs 710, 720 in a MAP-G to schedule the MAP transmissions to the STA 730. AP1 710 or AP2 720 or both, for example, may transmit a MAP ready to send (MAP-RTS) to establish the MAP TXOP to protect the MAP communications with the STA. The MBSS Controller 150 may coordinate to send the downlink MAP data to all the MAP-G members, i.e. AP1 710 and AP2 720. Other near-by non MAP-G STAs receiving this MAP-RTS may set their NAVs to prevent from interfering the communications.

In step 702, after receiving the MAP-RTS, the STA (730) sends a MAP clear to send (MAP-CTS) to confirm the MAP TXOP establishment and indicate the preferred MAP transmission options such as preferred MAP transmission type, HARQ re-transmission type, and AP ID(s) for the initial transmission(s). The STA 730 may set the MAP transmission type to "Joint MAP transmission" in the MAP-CTS for the joint MAP transmission. Other near-by STAs receiving this MAP-CTS may set their NAVs to prevent from interfering the MAP transmissions.

In step 703, both AP1 710 and AP2 720 may transmit to the STA 730 the same MAP-PPDU which may consist of A-MPDUs. The AP1 710 and AP2 720 may set the MAP-G ID to the SA field and the address of STA (730) to the RA field in the MAC header.

In step 704, the STA 730 may combine the received signals from AP1 720 and AP2 730 in either the RF baseband or PHY baseband and perform error checking on the combined MAP-PPDU or on each MPDU. If the STA 730 cannot decode the MAP-PPDU correctly or any MPDU in the A-MPDU, the STA 730 may send an MAP-NACK to request re-transmission of failed MPDU(s). The STA 730 may request to send HARQ re-transmission on different resource units (RUs) to avoid the interference on some particular RUs.

The STA 730 may set the source address (SA) to its address, the receiving address (RA) to the MAP-G ID, and/or the destination address (DA) to the MAP-G ID in the MAP-NACK if it is present. The STA 730 may set the MAP-G ID in the Common Information field of MAC header of MAP-NACK frame.

In step 705, after receiving the MAP-NACK from the STA 730, both AP1 710 and AP2 720 may adjust their timing to align with the STA and re-send the failed MPDU(s) in MAP-PPDU to the STA 730 at the requested time over specified RUs. AP1 710 and AP2 720 may set the MAP-G ID to the SA field and the address of STA 730 to the RA field in the MAC header of the retransmission.

In step 706, the STA 730 may check whether the CC or IR can correct the error(s) in the previous decoding with the joint MAP HARQ retransmissions. If an error is still detected, the STA 730 may send a MAP-NACK to request another HARQ re-transmission or report a HARQ re-transmission failure after a number of re-trials. If the error can be corrected in the joint MAP HARQ re-transmission, the STA 730 may send a MAP-ACK to acknowledge MAP-G members for the success of the MAP PPDU transmission.

After receiving the MAP-ACK, the MBSS Controller 150 may coordinate to schedule another MAP transmission in the MAP TXOP if there is more data buffered for the STA 730 and MAP TXOP is allowed for scheduling another MAP transmission.

In some embodiments, station controlled multi-AP transmission and HARQ re-transmission may include the MAP and HARQ support information in the EHT Capability Information Element (IE). The EHT Capability IE can be carried in EHT Beacon or Probe Response frame to indicate the capability of the AP.

Figure 8:
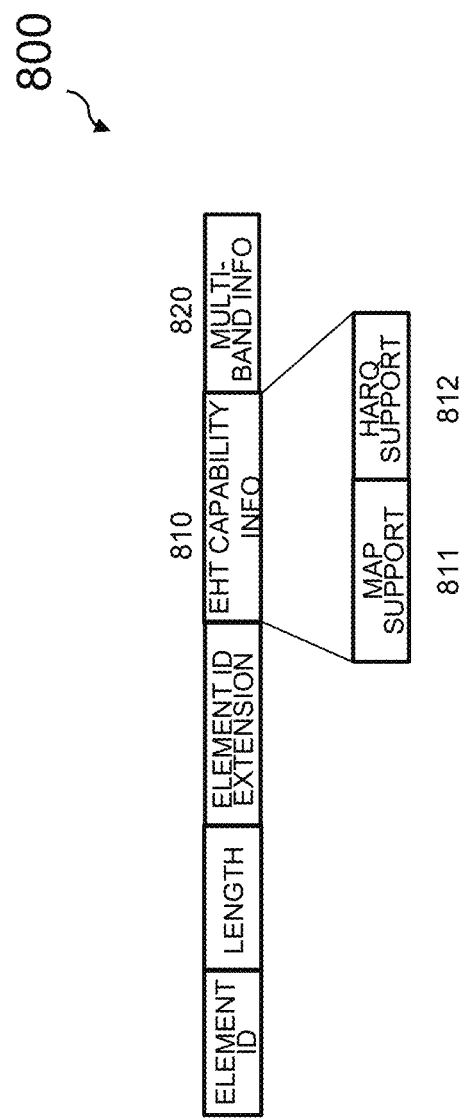
FIG. 8 illustrates an example of EHT Capability IE with MAP and HARQ Support information.

FIG. 8 illustrates an example of EHT Capability IE with MAP and HARQ Support information. In FIG. 8, the Information Element 800 may carry the information of EHT capability information and Multi-band operation information. The EHT Capability Info 810 may contain the MAP Support 811 and HARQ Support 812 information.

MAP Support information 811 indicate the MAP capability supported by the AP, and may include at least one of an indication that it does not support MAP, an indication that it supports selective MAP transmission only, an indication that it supports joint MAP transmission only, and an indication that it supports both selective and joint MAP transmission.

HARQ support information 812 may indicate the HARQ capability supported by the AP, which may include at least one of an indication to not support HARQ, i.e. only regular ARQ mechanism is supported, an indication that it only supports Chase Combining (CC) HARQ, an indication that it only supports Incremental Redundancy (IR) HARQ, and an indication that it supports both CC and IR HARQ.

The Multi-Band Info 820 may include the information of multi-channel which the AP is operating on. Example channels may include a 2.4 GHz, 5 GHz, or 6 GHz band.

Figure 9:
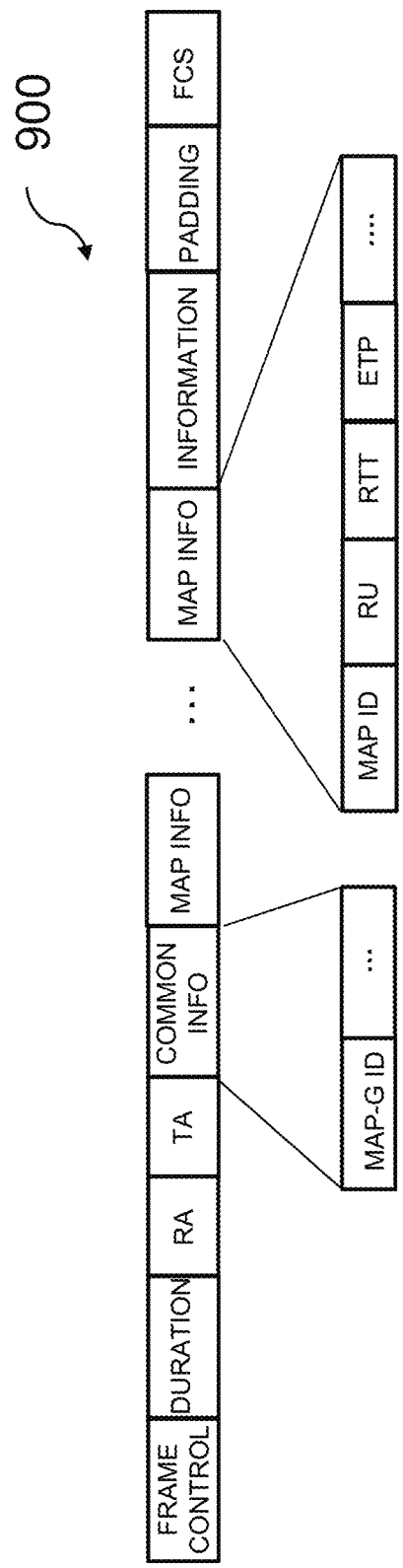
FIG. 9 illustrates an example MAC header format for an MAP control frame.

FIG. 9 illustrates an example MAC header format for an MAP control frame. The MAC header format for a MAP control frame may include, for example, a MAP NACK/ACK, MAP CTS, a MAP management frame (e.g., MAP Association Request).

The MAC header may include frame control (FC) to indicate the MAC frame type and other information about the frame. The MAC header may include a transmission duration of this frame. The MAC header may include any of a receiving address (RA), a transmission address (TA), and a destination address (DA). The DA may be set to the MAP-G ID for the MAP transmission.

The MAC header may include a common information field. The common info field may include at least one of a MAP-G ID to identify the MAP-G and a NACK IND to indicate that this frame is either MAP-NACK or MAP-ACK. If the NACK IND is set to MAP-ACK, then the previous MAP transmission or re-transmission succeeded. Otherwise, there may be an error in the previous MAP transmission or re-transmission. Another re-transmission in either CC or IR may be needed.

The common info field may include a MAP Type indicating the type (Selective or Joint) of MAP transmission to be used. If it is Joint MAP transmission, the MAP-G members may be requested to transmit the MAP PPDU jointly after receiving this frame. Otherwise, the selected MAP-G member(s) may be requested to transmit the MAP PPDU.

The common info field may include a MAP Switch Reservation indicating whether other MAP-G members need to reserve RU(s) and perform data buffer synchronization with the active MAP-G member for preparing MAP member switch in the selective MAP transmission.

The common info field may include a HARQ type indicating the HARQ type (i.e. non-HARQ, HARQ-CC or HARQ-IR) to be used in the HARQ retransmission.

The MAC header may include MAP information that carries the information for individual AP in the MAP transmission. The MAP information may include at least one of a MAP ID specifying the individual AP for the MAP transmission, an RU indicating the Resource Unit (RU) to be used for the MAP transmission from that AP, and a RTT, where the STA in MAP-G may use the Requested Transmission Time (RTT) to specify the time for the AP with MAP ID to start an MAP PPDU transmission. The AP may adjust its timing clock when receiving this frame and schedule the MAP PPDU transmission at the time according to the RTT value. The MAP information may include an ETP indicating the expected transmit power for the AP to send MAP PPDU.

In some embodiments, the station controlled multi-AP transmission and HARQ re-transmission may include a HARQ NACK frame to identify the failed MPDU in MAP PPDU.

Figure 10A:
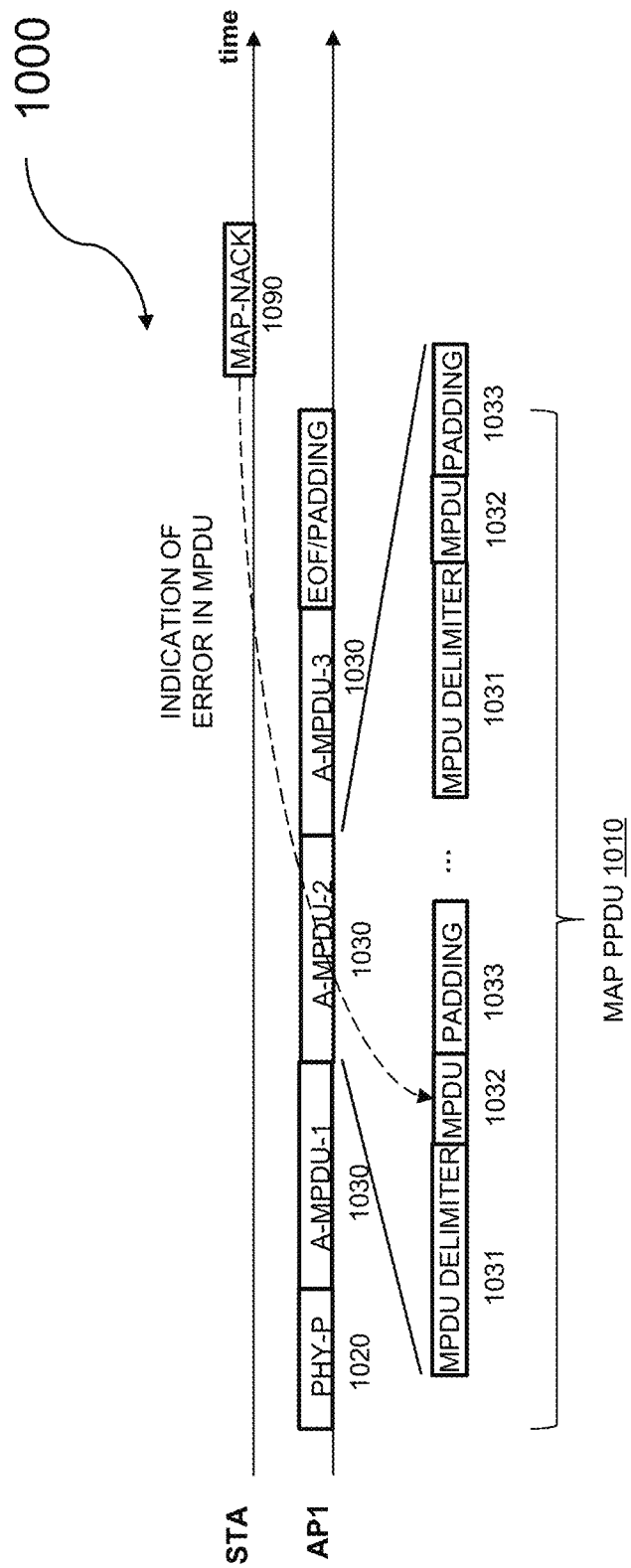
FIGS. 10A-10B illustrate examples of HARQ NACK to identify the failed MPDU or HPDU in the MAP PPDU.
Figure 10B:
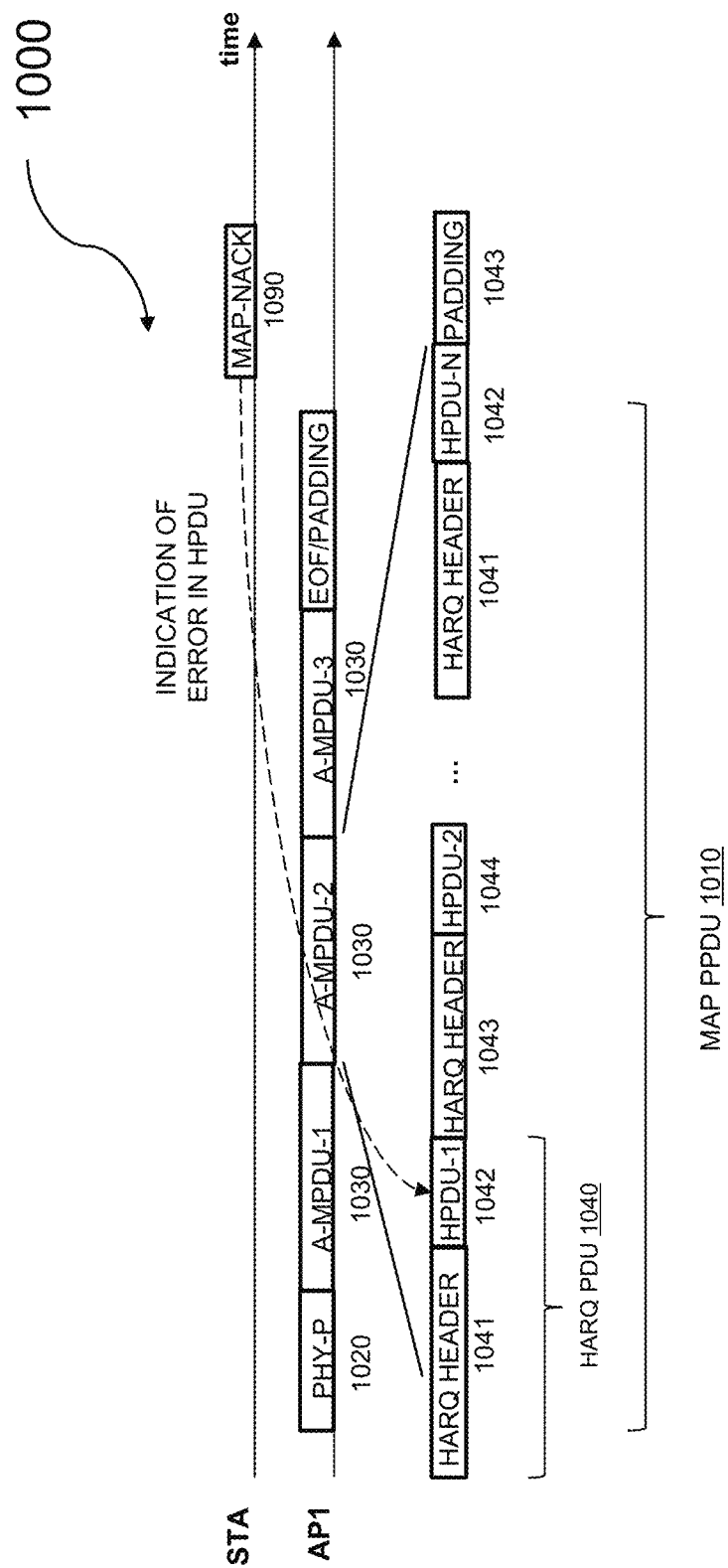

FIG. 10 illustrates an example of HARQ NACK to identify the failed MPDU in the MAP PPDU. The MAP-PPDU 1010 may be in the PPDU format that may include at least one of a PHY Preamble 1020 that includes L-STF, L-LTF, L-SIG, RL-SIG, HE-SIG-A, HE-STF, HE-LTF, EHT-SIG, etc., and a MAP A-MPDU 1030 that is the payload of PPDU 1010. The MAP A-MPDU 1030 may include a MPDU Delimiter 1031, MPDU 1032, and Padding 1033.

The MAP-NACK 1090 may be the HARQ NACK frame used to indicate the location of failed MPDU 1032 in the received MAP-PPDU 1010. The MAP-NACK 1090 may include a bit map, in which each bit is mapped to a received MPDU. If an error is detected in a received MPDU, this corresponding bit of the bit map in MAP-NACK may be set to 1 to indicate the retransmission of this MPDU is required. The NACK bit map may be carried in the MAP-NACK frame.

The MAP HARQ retransmission mechanism could leverage the MAC layer MPDU retransmission with PHY layer combination (CC or IR) to improve the reliability of retransmission. The minimum unit of HARQ retransmission may be the size of MPDU.

The MAP-PPDU 1010 may include a PHY Preamble 1020 and a MAC payload that includes one or more A-MPDUs 1030 and Padding.

The MAC payload may be segmented by the PHY layer into multiple HARQ PDUs according to the HARQ transmission requirement. The minimum unit of HARQ retransmission could be different from the MPDU size.

The HARQ PDU 1040 may include a HARQ Header 1041 and HPDU 1042.

The MAP-NACK 1090 may include the HARQ NACK frame which is used to indicate the location of failed HARQ PDU 1040 in the received MAP-PPDU 1010. The MAP-NACK 1090 may include a bit map, in which each bit is mapped to a received HARQ PDU 1040. If an error is detected in a received HARQ PDU 1040, the corresponding bit of the bit map in MAP-NACK may be set to 1 to indicate the retransmission of this HARQ PDU is required. The NACK bit map is carried in the MAP-NACK frame.

Figure 11:
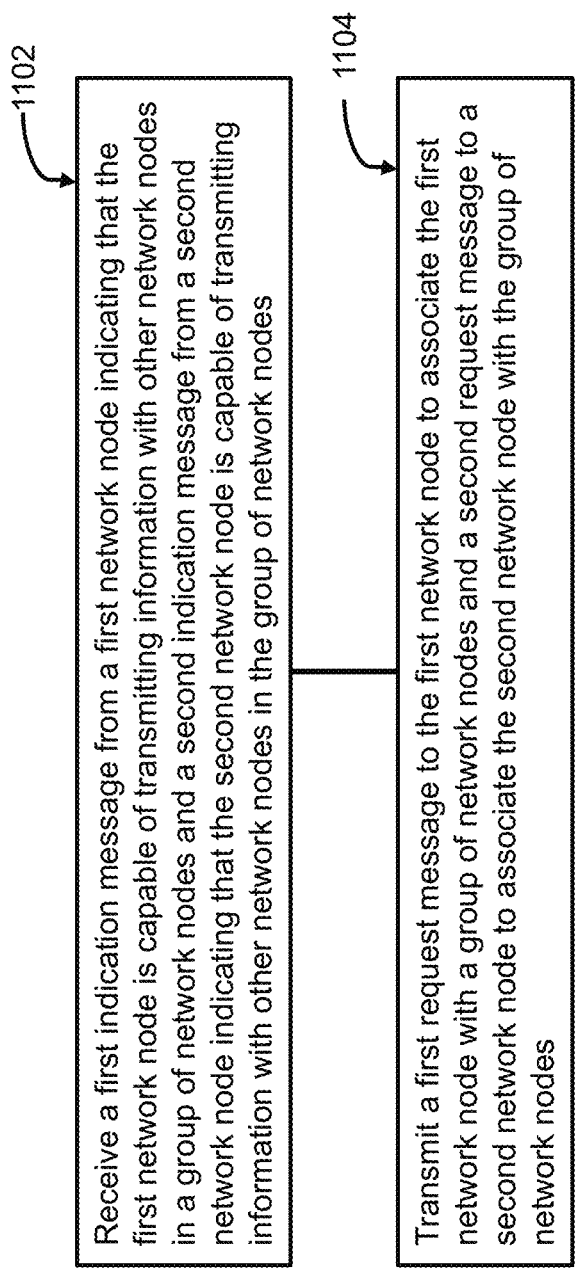
FIG. 11 illustrates a block diagram of a method for station controlled multiple access point transmission and retransmission.

FIG. 11 illustrates a block diagram of a method for station controlled multiple access point transmission and retransmission. In a first exemplary embodiment, a method includes receiving, by a station, a first indication message from a first network node indicating that the first network node is capable of transmitting information with other network nodes in a group of network nodes and a second indication message from a second network node indicating that the second network node is capable of transmitting information with other network nodes in the group of network nodes (block 1102). The first indication message and the second indication message may include information identifying that an access point is capable of joint transmission, as illustrated in FIGS. 3A-3B, for example. The first network node and the second network node may include AP1 and AP2 included in a MAP-G, as illustrated in various embodiments of the present disclosure.

The method also includes transmitting, by the station, a first request message to the first network node to associate the first network node with a group of network nodes and a second request message to a second network node to associate the second network node with the group of network nodes (block 1104). The first request message may include a MAP association request to AP1 and AP2 indicating a request to join a requested MAP-G, as illustrated in Step 403 of FIG. 4, for example.

In some embodiments, the method includes receiving, by the station, at least one of a first response message from the first network node and a second response message the second network node indicating an acknowledgement that at least one of the first network node and/or the second network node are included in the group of network nodes.

In some embodiments, the method includes transmitting, by the station, a multi-network node group acknowledgement message indicating a confirmation that the station identifies the group of network nodes as including the first network node and the second network node.

In some embodiments, the first indication message and the second indication message include multi-network node support information and hybrid automatic repeat request (HARQ) support information in an extremely high throughput (EHT) capability information element of the multi-network node capability indication message.

In some embodiments, the multi-network node support information includes at least one of information indicating that the second network node does not support multi-network node functionality, information indicating that the second network node support selective multi-network node transmission, information indicating that the second network node supports joint multi-network node transmission, and information indicating that the second network node supports both selective multi-network node transmission and joint multi-network node transmission.

In some embodiments, the HARQ support information includes at least one of information indicating that the second network node does not support HARQ, information indicating that the second network node supports chase combining (CC) HARQ only, information indicating that the second network node support incremental redundancy (IR) HARQ only, and information indicating that the second network node supports both CC HARQ and IR HARQ.

In some embodiments, the first request message includes a multi-network node group identifier identifying the group of network nodes.

In some embodiments, the first network node and the second network node are configured to align a timing of the first network node and the second network node with a timing associated with the station based on receiving the first request message.

In some embodiments, the method includes transmitting, by the station, a multi-network node re-association request message to update the group of network nodes, wherein updating the group of network nodes includes adding a new network node or removing a network node from the group of network nodes.

In some embodiments, the method includes initiating, by the station, timer to track a lifecycle of the group of network nodes upon receiving the multi-network node association response message from the first network node and the second network node.

In some embodiments, the method includes releasing, by the station, the group of network nodes upon expiration of the timer.

In some embodiments, the method includes transmitting, by the station, a disassociation message to all network nodes associated with the multi-network node group to release the network nodes from the multi-network node.

In some embodiments, the first network node and the second network node are interconnected via a switch through a distributed system (DS) forming a multi-basic service set (BSS).

In another exemplary embodiment, a method for wireless communication includes transmitting, by a station, a first message to at least one of a first network node and a second network node in a group of network nodes, wherein the first message includes transmission configuration information. The method also includes receiving, by the station, data from at least one of the first network node and the second network node in the multi-network node group based on the transmission configuration information.

In some embodiments, the transmission configuration information includes a request for the first network node to transmit data on a first channel.

In some embodiments, the data is transmitted by the first network node via a physical layer convergence procedure (PLCP) protocol data unit (PPDU) that includes multiple aggregated medium access control protocol data units (MP-DUs).

In some embodiments, the transmission configuration information includes a request for the first network node and the second network node to jointly transmit the data to the station, and wherein the data is received from both the first network node and the second network node.

In some embodiments, the first network node transmits the data on a first channel, and wherein the second network node transmits the data on a second channel.

In some embodiments, the method includes combining, by the station, the data transmitted by the first network node and the second network node in a physical (PHY) baseband.

In some embodiments, the first network node transmits the data on a first channel, and wherein the second network node transmits the data on the first channel.

In some embodiments, the method includes combining, by the station, the data transmitted by the first network node and the second network node in a radio frequency (RF) module.

In another exemplary embodiment, a method for wireless communication includes receiving, by a first network node included in a group of network nodes, scheduling information from a controller that controls transmissions by the group of network nodes to schedule a time to transmit a send request message to a station. The method also includes transmitting, by the first network node included in the group of network nodes, the send request message to the station at the time indicated by the controller based on the scheduling information.

In some embodiments, the send request message is transmitted on a first channel, and wherein a second network node included in the group of network nodes is configured to transmit the second send request message on a second channel.

In some embodiments, the send request message is transmitted on a first channel, and wherein a second network node included in the group of network nodes is configured to transmit the second send request message on the first channel.

In some embodiments, the method includes receiving, by the first network node included in the group of network nodes, a clear to send message from the station indicating a request for the first network node to transmit data to the station.

In some embodiments, the clear to send message is received by at least one other network node included in the group of network nodes.

In some embodiments, a station not included in the group of network nodes is configured to update a network-allocation vector (NAV) to prevent transmission of data during a transmit opportunity (TXOP) time period associated with the group of network nodes based on receiving the send request message.

In some embodiments, the clear to send message includes at least one of a preferred multi-network node transmission type indicating one of a selective multi-network node transmission or a joint multi-network node transmission, a multi-network node transmission switch reservation for joint multi-network node transmission, a hybrid automatic repeat request (HARQ) retransmission type indicating a chase combining (CC) or incremental redundancy (IR), an identity of at least one network node in the group of network nodes, a received signal strength (RSSI) measurement, and a preferred downlink transmission power on an operating channel.

In another exemplary embodiment, a method for wireless communication includes receiving, by a station, a first message from a first network node included in a group of network nodes, wherein the station initiates formation of the group of network nodes. The method also includes determining, by the station, that an error exists in a part of the first message. The method also includes transmitting, by the station, a second message indicating a request to the first network node to re-transmit the part of the first message.

In some embodiments, the second message includes a medium access control (MAC) header for a multi-network node control frame.

In some embodiments, the MAC header includes a common information field, wherein the common information field includes at least one of an identifier identifying the group of network nodes, a no acknowledgement (NACK) identifier indicating the error in the first message, a multi-network node type indicating a subsequent message to be transmitted in one of a joint multi-network node transmission or a selective multi-network node transmission, a multi-network node switch reservation indicating other network nodes in the group of network nodes to reserve resource units (RUs) and perform data buffer synchronization with other network nodes in the group, and a HARQ type to be used in a subsequent HARQ re-transmission.

In some embodiments, the method includes receiving, by the station, a third message including the part of the first message that included the error.

In some embodiments, the second message includes a hybrid automatic repeat request (HARQ).

In some embodiments, a network node group controller is configured to schedule a joint transmission of the information included in the first message by each network node included in the group of network nodes.

In some embodiments, the first message includes a physical layer convergence procedure (PLCP) protocol data unit (PPDU) that includes multiple aggregated medium access control protocol data units (MPDUs).

In some embodiments, said determining includes inspecting each MPDU received in the first message for errors.

In some embodiments, the second message includes a HARQ request to re-transmit at least one MPDU included in the first message.

In some embodiments, the second message includes a HARQ request to re-transmit the PPDU on a second resource unit (RU) included in a control frame of a third message.

In some embodiments, the method includes setting, by the station, a source address of the second message as an address of the station, a receiving address of the second message as an address of the first network node included in the group of network nodes, and/or a destination address of the second message as an identifier associated with the group of network nodes, wherein the identifier associated with the group of network nodes is included in a common information section of a medium access control (MAC) header of the second message.

In some embodiments, a second network node included in the group of network nodes is configured to receive the second message from the station transmit a fourth message simultaneously with the transmission of the third message to the first network node, wherein the fourth message and the third message include the same MPDUs identified in the second message.

In some embodiments, the third message is independently decodable by the station for the station to determine whether errors exist in the third message.

In some embodiments, the method includes determining, by the station, that the third message does not include any errors; and transmitting, by the station, a fifth message acknowledging successful transmission of the third message to the first network node.

In some embodiments, the network node group controller is a multi-basic service set (MBSS) controller configured to schedule a subsequent multi-network node transmission by the network nodes included in the group of network nodes during a TXOP time period associated with the group of network nodes based on determining the TXOP time period allows for the subsequent multi-network node transmission by the network nodes.

In some embodiments, the MPDUs identified in the second message are transmitted jointly by the first network node and the second network node in the third message and by the first network node and the second network node in the group of network nodes in the fourth message over resource units (RUs) specified in the second message.

In some embodiments, the method includes combining, by the station, the third message received in the joint transmission by the first network node and second network node by one of the radio frequency (RF) module or the physical (PHY) layer baseband; and transmitting, by the station, the fourth message to the first network node and the second network node to identify any failed MPDUs transmitted in the first message and the third message.

In some embodiments, the second message includes a medium access control (MAC) header for a multi-network node control frame.

In another exemplary embodiment, a method for wireless communication includes receiving, by a station, a first message from a first network node included in a group of network nodes. The method also includes determining, by the station, that a part of the first message includes an error. The method also includes transmitting, by the station, a second message to a second network node included in the group of network nodes, wherein the second message includes a request to re-transmit the part of the first message that includes the error.

In some embodiments, the method includes receiving, by the station, a third message from the second network node, wherein the third message includes the part of the first message that includes the error.

In some embodiments, the second message includes an identifier identifying the group of network nodes, and wherein the second network node is configured to transmit the third message based on determining that the identifier matches the group of network nodes associated with the second network node.

In some embodiments, the first message includes a physical layer convergence procedure (PLCP) protocol data unit (PPDU) that includes multiple aggregated medium access control protocol data units (MPDUs).

In some embodiments, the second message includes a hybrid automatic repeat request (HARD) request to re-transmit at least one MPDU identified in the first message.

In some embodiments, the second message includes a bitmap corresponding with each MPDU transmitted in the first message, wherein the station is configured to update the bitmap based on identifying the error in the MPDU for the second network node to identify the MPDU with the error.

Figure 12:
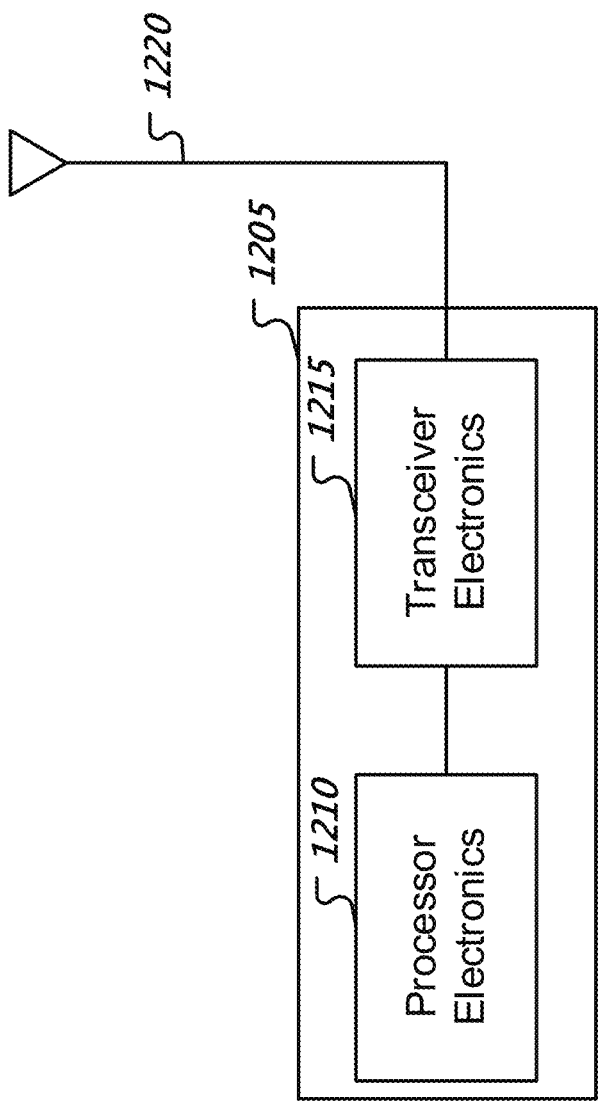
FIG. 12 is a block diagram representation of a portion of a hardware platform.

FIG. 12 is a block diagram representation of a portion of a hardware platform. A hardware platform 1205 such as a network device or a base station or a wireless device can include processor electronics 1210 such as a microprocessor that implements one or more of the techniques presented in this document. The hardware platform 1205 can include transceiver electronics 1215 to send and/or receive wired or wireless signals over one or more communication interfaces such as antenna 1220 or a wireline interface. The hardware platform 1205 can implement other communication interfaces with defined protocols for transmitting and receiving data. The hardware platform 1205 can include one or more memories (not explicitly shown) configured to store information such as data and/or instructions. In some implementations, the processor electronics 1210 can include at least a portion of the transceiver electronics 1215. In some embodiments, at least some of the disclosed techniques, modules or functions are implemented using the hardware platform 1205.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
   receiving, by a station, a first indication message from a
      first network node indicating that the first network node is capable of transmitting information with other network nodes in a group of network nodes and a second indication message from a second network node indicating that the second network node is capable of transmitting information with other network nodes in the group of network nodes, wherein the first network node and the second network node are included in a same multiple access point (MAP) group; and transmitting, by the station, a first request message to the first network node to associate the first network node with a group of network nodes and a second request message to a second network node to associate the second network node with the group of network nodes.

2. The method of claim 1, further comprising:
receiving, by the station, at least one of a first response message from the first network node and a second response message the second network node indicating an acknowledgement that at least one of the first network node and the second network node are included in the group of network nodes.

3. The method of claim 2, further comprising:
transmitting, by the station, a multi-network node group acknowledgement message indicating a confirmation that the station identifies the group of network nodes as including the first network node and the second network node.

4. The method of claim 1, wherein the first indication message and the second indication message include multi-network node support information and hybrid automatic repeat request (HARQ) support information in an extremely high throughput (EHT) capability information element of the multi-network node capability indication message.

5. The method of claim 4, wherein the multi-network node support information includes at least one of information indicating that the second network node does not support multi-network node functionality, information indicating that the second network node support selective multi-network node transmission, information indicating that the second network node supports joint multi-network node transmission, and information indicating that the second network node supports both selective multi-network node transmission and joint multi-network node transmission.

6. The method of claim 4, wherein the HARQ support information includes at least one of information indicating that the second network node does not support HARQ, information indicating that the second network node supports chase combining (CC) HARQ only, information indicating that the second network node support incremental redundancy (IR) HARQ only, and information indicating that the second network node supports both CC HARQ and IR HARQ.

7. The method of claim 1, wherein the first request message includes a multi-network node group identifier identifying the group of network nodes.

8. The method of claim 2, wherein the first network node and the second network node are configured to align a timing of the first network node and the second network node with a timing associated with the station based on receiving the first request message.

9. The method of claim 1, further comprising:
transmitting, by the station, a multi-network node re-association request message to update the group of network nodes, wherein updating the group of network nodes includes adding a new network node or removing a network node from the group of network nodes.

10. The method of claim 2, further comprising:
initiating, by the station, timer to track a lifecycle of the group of network nodes upon receiving the multi-network node association response message from the first network node and the second network node.

11. The method of claim 10, further comprising:
releasing, by the station, the group of network nodes upon expiration of the timer.

12. The method of claim 1, further comprising:
transmitting, by the station, a disassociation message to all network nodes associated with the multi-network node group to release the network nodes from the multi-network node.

13. The method of claim 1, wherein the first network node and the second network node are interconnected via a switch through a distributed system (DS) forming a multi-basic service set (BSS).

14. A method of wireless communication, comprising:
transmitting, by a station, a first message to at least one of a first network node and a second network node in a group of network nodes, wherein the first message includes transmission configuration information; and
receiving, by the station, data from at least one of the first network node and the second network node in the multi-network node group based on the transmission configuration information, wherein the first network node and the second network node are included in a same multiple access point (MAP) group.

15. The method of claim 14, wherein the transmission configuration information includes a request for the first network node to transmit data on a first channel.

16. The method of claim 15, wherein the data is transmitted by the first network node via a physical layer convergence procedure (PLCP) protocol data unit (PPDU) that includes multiple aggregated medium access control protocol data units (MPDUs).

17. The method of claim 14, wherein the transmission configuration information includes a request for the first network node and the second network node to jointly transmit the data to the station, and wherein the data is received from both the first network node and the second network node.

18. The method of claim 17, wherein the first network node transmits the data on a first channel, and wherein the second network node transmits the data on a second channel.

19. The method of claim 18, further comprising:
combining, by the station, the data transmitted by the first network node and the second network node in a physical (PHY) baseband.

20. The method of claim 17, wherein the first network node transmits the data on a first channel, and wherein the second network node transmits the data on the first channel.

21. The method of claim 18, further comprising:
combining, by the station, the data transmitted by the first network node and the second network node in a radio frequency (RF) module.

22. A method for wireless communication, comprising:
receiving, by a first network node included in a group of network nodes, scheduling information from a controller that controls transmissions by the group of network nodes to schedule a time to transmit a send request message to a station, wherein the first network node is included in a multiple access point (MAP) group; and
transmitting, by the first network node included in the group of network nodes, the send request message to the station at the time indicated by the controller based on the scheduling information.

23. The method of claim 22, wherein the send request message is transmitted on a first channel, and wherein a second network node included in the group of network nodes is configured to transmit the second send request message on a second channel.

24. The method of claim 22, wherein the send request message is transmitted on a first channel, and wherein a second network node included in the group of network nodes is configured to transmit the second send request message on the first channel.

25. The method of claim 22, further comprising:
receiving, by the first network node included in the group of network nodes, a clear to send message from the station indicating a request for the first network node to transmit data to the station.

26. The method of claim 25, wherein the clear to send message is received by at least one other network node included in the group of network nodes.

27. The method of claim 22, wherein a station not included in the group of network nodes is configured to update a network-allocation vector (NAV) to prevent transmission of data during a transmit opportunity (TXOP) time period associated with the group of network nodes based on receiving the send request message.

28. The method of claim 25, wherein the clear to send message includes at least one of a preferred multi-network node transmission type indicating one of a selective multi-network node transmission or a joint multi-network node transmission, a multi-network node transmission switch reservation for joint multi-network node transmission, a hybrid automatic repeat request (HARQ) retransmission type indicating a chase combining (CC) or incremental redundancy (IR), an identity of at least one network node in the group of network nodes, a received signal strength (RSSI) measurement, and a preferred downlink transmission power on an operating channel.

* * * * *

UNITED STATES PATENT AND TRADEMARK OFFICE
CERTIFICATE OF CORRECTION

PATENT NO. : 10,985,875 B2
APPLICATION NO. : 16/297564
DATED : April 20, 2021
INVENTOR(S) : Yonggang Fang It is certified that error appears in the above-identified patent and that said Letters Patent is hereby corrected as shown below:

On the Title Page

In Item (57), under "ABSTRACT", in Column 2, Line 1, delete "related to related to" and insert -- related to --, therefor.

In the Specification

In Column 3, Line 31, delete "(HARD)" and insert -- (HARQ) --, therefor.

In Column 3, Line 51, delete "(MAP)" and insert -- (MAPs) --, therefor.

In Column 3, Lines 63-64, delete "signal-to-noise-ratio (SINR)" and insert -- signal-to-interference-noise-ratio (SINR) --, therefor.

In Column 4, Line 4, delete "(HARD)" and insert -- (HARQ) --, therefor.

In Column 5, Line 55, delete "channel." and insert -- channels. --, therefor.

In Column 6, Line 20, delete "down link" and insert -- downlink --, therefor.

In Column 7, Line 4, delete "with" and insert -- by --, therefor.

In Column 7, Line 13, delete "on the" and insert -- the --, therefor.

In Column 10, Line 61, delete "message the" and insert -- message from the --, therefor.

In Column 11, Line 58, delete "(BSS)." and insert -- (MBSS). --, therefor.

In Column 13, Line 3, delete "strength (RSSI)" and insert -- strength indicator (RSSI) --, therefor.

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,985,875 B2

In Column 14, Line 63, delete "(HARD)" and insert -- (HARQ) --, therefor.

In Column 15, Line 43, delete "them." and insert -- of them. --, therefor.

In Column 16, Lines 32-33, delete "CD ROM" and insert -- CD-ROM --, therefor.

In the Claims

In Column 17, Line 18, in Claim 2, delete "message the" and insert -- message from the --, therefor.

In Column 18, Line 17, in Claim 13, delete "(BSS)." and insert -- (MBSS). --, therefor.

In Column 20, Lines 16-17, in Claim 28, delete "strength (RSSI)" and insert -- strength indicator (RSSI) --, therefor.